Nov. 21, 1933.  H. R. KIMBLER  1,936,304
ANTIGLARE DEVICE
Filed Oct. 20, 1932
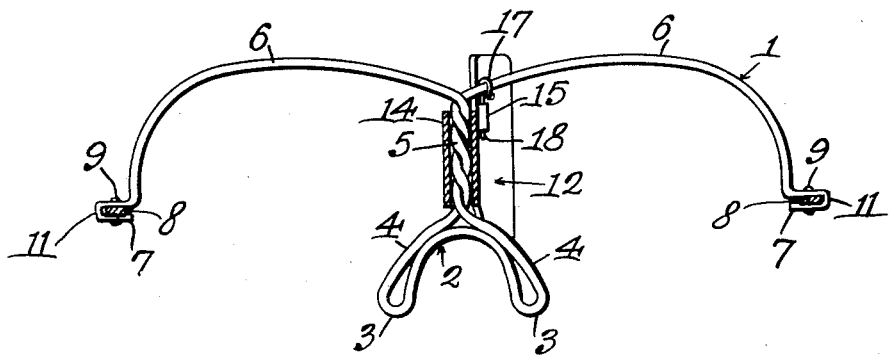
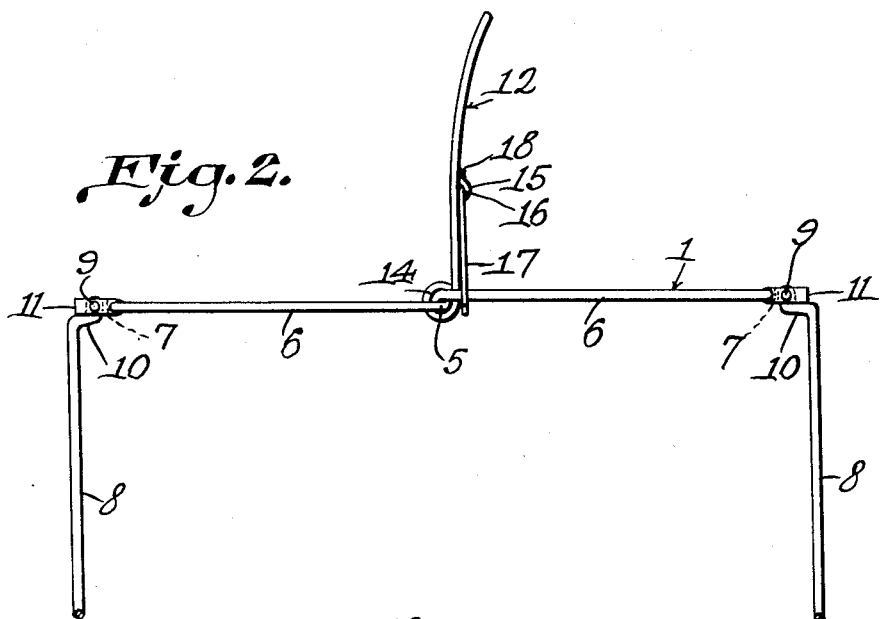
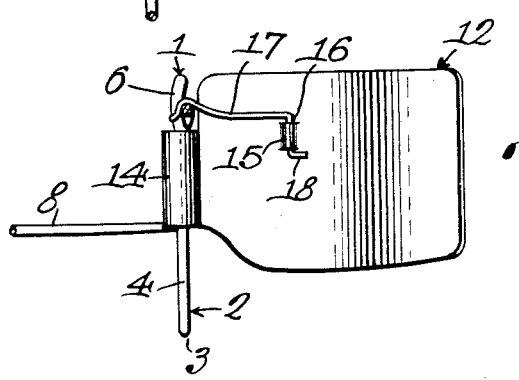
H. R. Kimbler Inventor Patented Nov. 21, 1933

1,936,304

UNITED STATES PATENT OFFICE 1,936,304

ANTIGLARE DEVICE

Henry Randolph Kimbler, Fort Worth, Tex., assignor of one-fourth to Albert A. Lund, Fort Worth, Tex.

Application October 20, 1932. Serial No. 638,813

3 Claims. (Cl. 2—12)

This invention aims to provide a device adapted to be worn like a pair of spectacles, either with or without spectacles, and so constituted that one eye of the wearer will be protected from the glare of the headlights of approaching vehicles.

The invention aims to improve the construction of the frame, to locate the shield in a novel manner with respect to the frame, to provide novel means for holding the shield in place, and, generally, to improve and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in elevation, a device constructed in accordance with the invention, parts being in section;

Fig. 2 is a top plan wherein parts are broken away;

Fig. 3 is a transverse section.

In carrying out the invention, there is provided a frame 1, which may be constructed in any desired way, and of any desired material. The frame and other parts of the device preferably are colored black, or otherwise, so as not to reflect light into the eye of the wearer.

As shown, but not of necessity, the frame 1 is formed of a single piece of material, curved to form a nose-piece or crutch 2, the ends 3 of the nose-piece being extended reversely along the sides of the nose-piece to define reenforcing arms 4 which are twisted together to constitute a standard 5, disposed above the nose-piece 2 and joined to the inner ends of the bows 6. The constituent portions of the standard 5 are prolonged in opposite directions to form open-bottomed frame bows 6, terminating in under-lying hooks 7 wherein temples 8 are pivoted as shown at 9. The space below the bows 6 is unencumbered, to provide unrestricted downward range of vision. The temples 8 are provided with transverse shoulders 10 which engage the outer portions 11 of the hooks 7, to limit the opening movement of the temples.

A forwardly extended, opaque shield 12 is provided and preferably is curved a little at its outer end toward the line of vision of the right eye of the wearer. At its inner end, the shield 12 has a hinge socket engaged about the depending standard 5 and forming a foldable mounting for the shield, the socket being marked by the numeral 14. An eye 15 is struck from the shield 12, and the numeral 17 designates a hook-shaped latch having a shank 16 disposed about at right angles to the hook, and mounted in the eye 15. The shank 16 of the latch is provided at its lower end with a finger 18, projecting in an opposite direction from the body portion of the latch, the body portion of the latch and the finger bearing against the side of the shield 12, to hold the latch in parallel relation to the shield. When the shield 12 is in the outstanding position of Fig. 2, the latch 17, which is resilient, is engaged over one of the frame bows 6, to hold the shield in the position stated. The arms 4 on the one hand, and the bows 6 on the other hand, cooperating with the ends of the hinge socket 14 on the shield 12, prevent the shield from having any appreciable vertical movement, although, when the hook-shaped latch 17 is freed from one of the bows 6, the shield 12 can be folded over into parallelism with the frame 1, as will be understood readily from the drawing.

The device forming the subject matter of this application is worn like a pair of glasses, and may be worn either in addition to the wearer's regular glasses, or without them. The shield 12 keeps the glare out of the wearer's right eye, and accomplishes a desirable result well understood by any one having occasion to use a device of the class described. The shield 12 is mounted for lateral swinging adjustment on the standard 5, between the bows 6 and the nose crutch 2, the nose crutch and the bows limiting the movement of the shield, longitudinally of the standard.

Special attention is directed to the fact that the bows 6 are open-bottomed. Owing to this construction, the frame does not interfere with the vision of the wearer as the wearer looks downwardly.

Having thus described the invention, what is claimed is:

1. A device of the class described comprising a frame formed of a single piece of material curved to fashion a nose-piece, the ends of the nose-piece being extended reversely along the sides of the nose-piece, to define reenforcing arms which are twisted together to constitute a standard, disposed above the nose-piece, the constituent portions of the standard being prolonged in opposite directions to form open-bottomed frame bows, temples pivoted to the outer ends of the frame bows, a forwardly projecting shield mounted to swing on the standard, and a detachable latch connection between the shield and a portion of the frame.

2. A device of the class described comprising a frame formed of a single piece of metal curved to fashion a nose-piece, the ends of the nose-piece being extended reversely along the sides of the nose-piece to define reenforcing arms which are disposed together to constitute a standard, arranged above the nose-piece, the constituent portions of the standard being prolonged in opposite directions to form open-bottomed frame bows, temples pivoted to the said bows, said bows forming the sole mounting for the temples, a forwardly presented shield, and means for mounting the shield on the standard, the space below said bows being unincumbered, to provide unrestricted downward range of vision.

3. A device of the class described, comprising a frame embodying open-bottomed bows, the space below the bows being open and unincumbered, a depending standard having its upper end joined to the inner ends of the bows, a nose crutch joined to the lower end of the standard, a forwardly presented shield mounted for lateral swinging adjustment on the standard, between the bows and the nose crutch, the bows and the nose crutch limiting the movement of the shield longitudinally of the standard, and temples assembled with the outer ends of the bows.

HENRY RANDOLPH KIMBLER.